(12) United States Patent
Chen et al.

(10) Patent No.: US 9,361,122 B2
(45) Date of Patent: Jun. 7, 2016

(54) METHOD AND ELECTRONIC DEVICE OF FILE SYSTEM PREFETCHING AND BOOT-UP METHOD

(71) Applicant: HTC Corporation, Taoyuan County (TW)

(72) Inventors: Kao-Pin Chen, Taoyuan County (TW); Chih-Tsung Wu, Taoyuan County (TW); Wen-Yen Chang, Taoyuan County (TW); Ting-Lun Chen, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 471 days.

(21) Appl. No.: 13/762,365

(22) Filed: Feb. 8, 2013

(65) Prior Publication Data

US 2014/0229724 A1    Aug. 14, 2014

(51) Int. Cl.
*G06F 9/44* (2006.01)
(52) U.S. Cl.
CPC .............. *G06F 9/4405* (2013.01); *G06F 9/441* (2013.01); *G06F 9/4406* (2013.01)
(58) Field of Classification Search
CPC .............. G06F 1/00; G06F 1/04; G06F 1/12; G06F 1/26; G06F 1/32; G06F 11/30; G06F 15/16
See application file for complete search history.

(56) References Cited

U.S. PATENT DOCUMENTS

| | | | |
|---|---|---|---|
| 6,317,818 B1 | 11/2001 | Zwiegincew et al. | |
| 7,127,600 B2 | 10/2006 | Zimmer et al. | |
| 7,607,000 B1 * | 10/2009 | Smith | G06F 9/4406 711/162 |
| 7,769,992 B2 | 8/2010 | Wang | |
| 7,774,327 B1 | 8/2010 | Rao et al. | |
| 8,140,839 B2 | 3/2012 | Wang | |
| 8,161,245 B2 | 4/2012 | Fields, Jr. et al. | |
| 8,688,968 B2 * | 4/2014 | Chu | G06F 9/4406 713/2 |
| 2002/0019723 A1 * | 2/2002 | Zwiegincew et al. | 702/186 |

(Continued)

FOREIGN PATENT DOCUMENTS

| | | |
|---|---|---|
| TW | 200805159 | 1/2008 |
| TW | 201239626 | 10/2012 |
| WO | 2006066473 | 6/2006 |

OTHER PUBLICATIONS

"Office Action of European Counterpart Application", issued on Dec. 18, 2013, p. 1-p. 7.

(Continued)

*Primary Examiner* — Chun Cao
*Assistant Examiner* — Mohammad A Rahman
(74) *Attorney, Agent, or Firm* — Jianq Chyun IP Office

(57) ABSTRACT

A method of file system prefetching is provided. The method is applicable to an electronic device including a volatile storage, a non-volatile storage, and multiple processors with multiple operating systems. The method includes the following steps. When a first static backup table in the non-volatile storage is not empty, copy all data in the first static backup table to a second static backup table in the volatile storage. Check whether the first static backup table includes all required data for booting one of the operating systems in a static partition of the non-volatile storage. When the first static backup table does not include all of the required data, copy a part of the remaining required data in the static partition to the first and the second static backup tables. Return to the checking step when a booting state synchronization of the operating systems is not completed yet.

10 Claims, 3 Drawing Sheets

(56) References Cited

U.S. PATENT DOCUMENTS

| | | | |
|---|---|---|---|
| 2005/0071617 A1* | 3/2005 | Zimmer | G06F 9/4401 713/1 |
| 2006/0020837 A1* | 1/2006 | Rothman et al. | 713/310 |
| 2008/0134191 A1* | 6/2008 | Warrier et al. | 718/104 |
| 2008/0282084 A1* | 11/2008 | Hatakeyama | G06F 21/57 713/155 |
| 2009/0158023 A1* | 6/2009 | Kern | G06F 9/4401 713/2 |
| 2009/0187915 A1* | 7/2009 | Chew et al. | 718/104 |
| 2009/0319478 A1 | 12/2009 | Proux et al. | |
| 2010/0153934 A1* | 6/2010 | Lachner | G06F 8/45 717/146 |
| 2011/0138165 A1* | 6/2011 | Bogner | G06F 9/4401 713/2 |
| 2012/0278600 A1 | 11/2012 | Mese et al. | |
| 2014/0191041 A1* | 7/2014 | Zhao et al. | 235/492 |

OTHER PUBLICATIONS

"Office Action of Taiwan Counterpart Application", issued on Jan. 6, 2015, p. 1-p. 3.

* cited by examiner

METHOD AND ELECTRONIC DEVICE OF FILE SYSTEM PREFETCHING AND BOOT-UP METHOD

BACKGROUND OF THE INVENTION

1. Field of the Invention

The present invention relates to a method and an electronic device of file system prefetching and a boot-up method. More particularly, the present invention relates to a method of file system prefetching during booting multiple operating systems (OS), an electronic device executing the method, and a corresponding boot-up method.

2. Description of the Related Art

A mobile device today, such as a smart phone, tablet computer, personal digital assistant (PDA), game console and the like, may include multiple processors. The multiple processors may execute multiple operating systems. For example, the main processor may execute the main operating system that provides applications and graphical user interfaces to serve the user, while an auxiliary processor may execute an embedded operating system to control a peripheral device, such as a wireless communication module of the mobile device.

In a typical multi-processor mobile device, the processors may operate according to different clock frequencies and the operating systems may have different levels of complexity. As a result, the time each processor takes to boot up the corresponding operating system is different. When the power of a multi-processor mobile device is powered on, each processor begins to boot up its operating system. The processors have to perform a booting state synchronization for establishing the communication mechanism among the processors and synchronizing the booting states of the operating systems to ensure a correct booting of the multi-processor multi-system mobile device.

After the booting state synchronization, the main operating system running on the main processor copies the data required for booting the main operating system from a slower non-volatile storage, such as a flash memory, to a faster volatile storage, such as a dynamic random-access memory (DRAM). The main operating system accesses the aforementioned data stored in the volatile storage during its booting sequence.

The bottleneck of booting the main operating system usually occurs on the aforementioned data copy from the non-volatile storage to the volatile storage. For example, the data copy may take 40% of the total booting time of the mobile device.

SUMMARY OF THE INVENTION

Accordingly, the present invention is directed to a method and an electronic device of file system prefetching and a boot-up method. The present invention can shorten the booting time of an electronic device with multiple processors and multiple operating systems by interleaving the time waiting for the booting state synchronization and the data copy from the non-volatile storage to the volatile storage.

According to an embodiment of the present invention, a method of file system prefetching is provided. The method is applicable to an electronic device including a volatile storage, a non-volatile storage, and a plurality of processors with a plurality of operating systems. The method includes the following steps. When a first static backup table in the non-volatile storage is not empty, copy all data in the first static backup table to a second static backup table in the volatile storage. Check whether the first static backup table includes all required data for booting one of the operating systems in a static partition of the non-volatile storage or not. When the first static backup table does not include all of the required data in the static partition, copy a part of the remaining required data in the static partition to the first and the second static backup tables. When a booting state synchronization of the operating systems is not completed yet, return to the step of checking whether the first static backup table includes all of the required data in the static partition or not.

According to another embodiment of the present invention, an electronic device of file system prefetching is provided. The electronic device includes a volatile storage, a non-volatile storage, and a plurality of processors with a plurality of operating systems. One of the plurality of processors is a main processor and the other ones of the plurality of processors are auxiliary processors. The main processor is coupled to the volatile storage, the non-volatile storage and the auxiliary processors. The main processor executes the aforementioned method of file system prefetching.

According to another embodiment of the present invention, a boot-up method for use in an electronic device including at least two processors is provided. The at least two processors run on at least two operating systems (OS). The boot-up method includes the following steps. Power up the electronic device. Execute system boot-up procedures corresponding to the at least two processors in parallel. Determine whether a first processor of the at least two processors completes the system boot-up procedure. In response to a second processor of the at least two processors being still booting, load at least a first portion of a data file from a first storage unit to a second storage unit. Determine whether the second processor completes the system boot-up procedure. In response to the second processor completing the system boot-up procedure, execute an OS boot-up procedure corresponding to the data file by the first processor.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
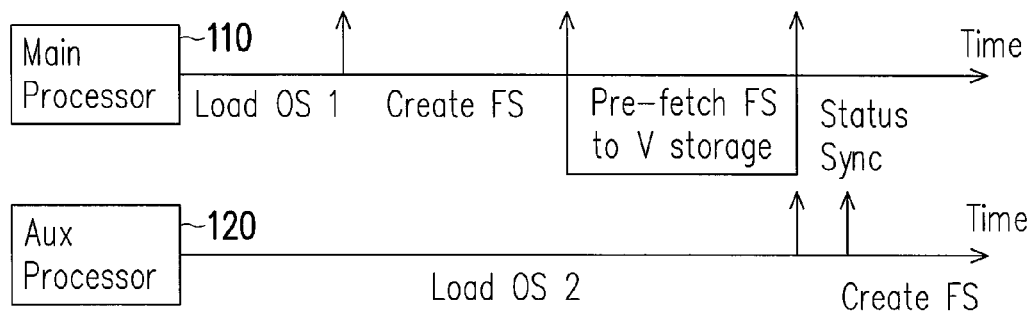
FIG. 1 is a schematic diagram showing an electronic device of file system prefetching according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

First please refer to FIG. 1, which depicts a diagram of file system prefetching according to an embodiment of the present invention. While booting up of an electronic device, the main processor 110 and the auxiliary processor 120 load operating system 1 and operating system 2 respectively. Upon completion of loading operating systems, the processors then create their own file systems (FS). The file system is stored in a non-volatile storage (NV storage) and would be copied to volatile storage (V storage) which has faster access speed to improve performance. However, the booting progress of main processor 110 and auxiliary processor 120 may not be in sync. As can be observed in FIG. 1, the auxiliary processor 120 takes longer time to load operating system 2. Therefore the main processor 110 would prefetch image of file system of the electronic device, which may include necessary information to configure the electronic device, from non-volatile storage to volatile storage prior to the auxiliary processor 120 completing loading of operating system 2. In the embodiment of the present invention, the main processor 110 may prefetch one fixed size of the file system at a time, for example N bytes at a time, to a predefined memory space within the volatile storage. The size N may be predefined or dynamically changed and the predefined memory space is allocated for prefetching only. When the auxiliary processor 120 completes loading of operating system 2 and sends a status sync signal to the main processor 110, prefetching of the file system may be terminated.

After synchronization of booting process among the main processor 110 and the auxiliary processor 120, the main processor 110 may proceed with normal file system creation. Due to some portion of the file system has already been prefetched, the main processor 110 may continue by performing hit/miss test in the volatile storage and access other portion of the file system that is not yet prefetched (missed) into the volatile storage from the non-volatile storage. The portion of the image of the file system which is fetched in normal procedure would be erased from the volatile storage when the electronic device is powered down and thus needs to be accessed again from non-volatile storage in next boot up procedure. Please note that the prefetched portion of the image of the file system would not be erased from the volatile storage and upon next boot up of the electronic device, the main processor 110 may continue to prefetch other portion of the file system from the non-volatile storage to the volatile storage. As a result, the time required to create the file system would be reduced after each time the electronic device is powered up with booting process.

Figure 2:
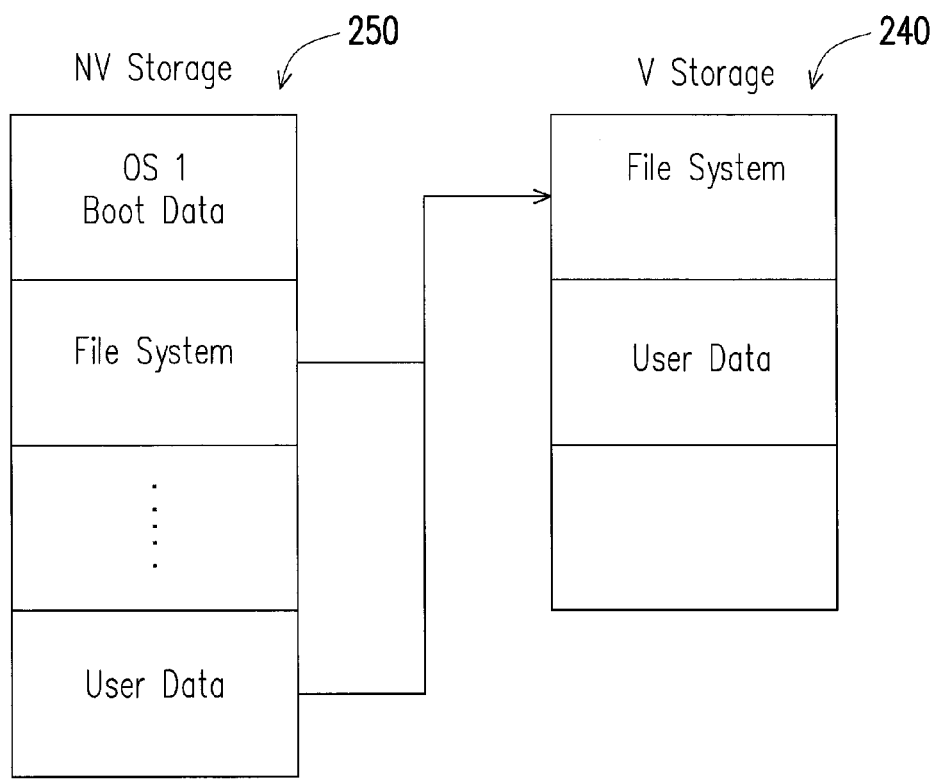
FIG. 2 a schematic diagram showing a memory configuration of file system prefetching according to an embodiment of the present invention

FIG. 2 is a schematic diagram showing a prefetch memory according to an embodiment of the present invention. The non-volatile storage 250 may store, among other, OS 1 boot data, image of file system, user data, and a copy of a portion of OS 1 boot data. The volatile storage 240 is allocated with a predefined memory space for storing prefetched data, comprising the image of file system and the portion of OS 1 boot data. The address range of the volatile storage 240 that has been filled with prefetched data may be recorded, and upon the next prefetch operation, the main processor 110 may continue to store prefetched data to the next location of the predefined memory space.

Figure 3:
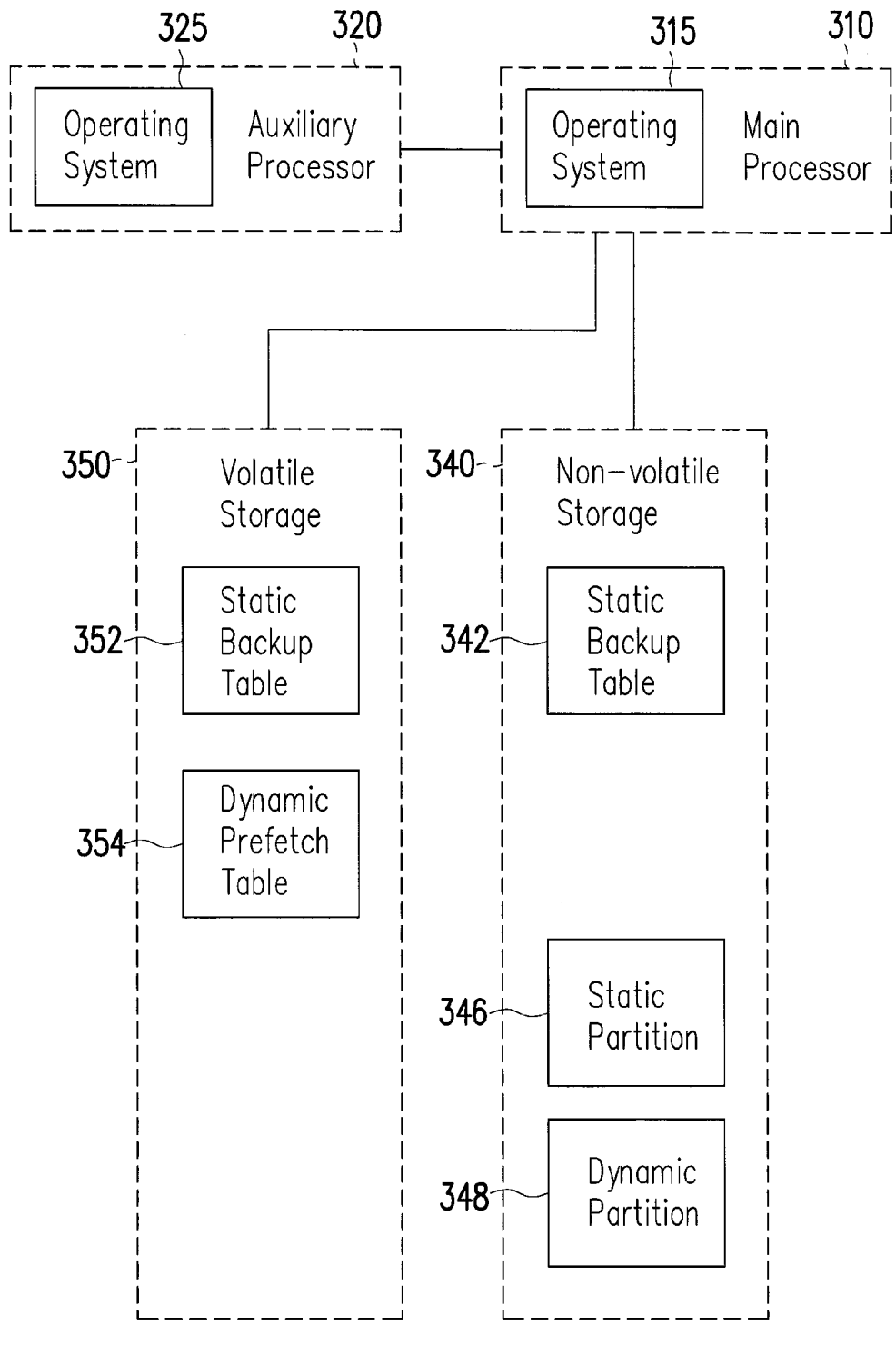
FIG. 3 is a schematic diagram showing an electronic device of file system prefetching according to another embodiment of the present invention.

FIG. 3 is a schematic diagram showing an electronic device 300 of file system prefetching according to an embodiment of the present invention. The electronic device 300 may be a mobile device such as a smart phone, a personal digital assistant (PDA), a tablet computer, a game console, or a media player, etc. Alternatively, the electronic device 300 may be any electronic device including multiple processors executing multiple operating systems.

The electronic device 300 includes a volatile storage 350, a non-volatile storage 340, a main processor 310, and an auxiliary processor 320. The access speed of the volatile storage 350 is faster than that of the non-volatile storage 340. The volatile storage 350 may be a random-access memory (RAM). The non-volatile storage 340 may be a hard disk, a memory stick, a memory card, a flash memory, or an embedded multimedia card (eMMC).

The main processor 310 executes the main operating system 315 of the electronic device 300. The main operating system 315 provides the applications and graphical user interfaces accessible to the user. The auxiliary processor 320 executes another operating system 325 for performing specific functions. The operating system 325 may control a part of the hardware of the electronic device 300. The main processor 310 is coupled to the volatile storage 350, the non-volatile storage 340 and the auxiliary processor 320.

The non-volatile storage 340 includes a static partition 346 and a dynamic partition 348. The static partition 346 and the dynamic partition 348 include the file system of the main operating system 315. The static partition 346 stores the data of the operating system 315, such as applications, device drivers and software libraries of the operating system 315. The data in the static partition 346 are unchangeable (read-only), which means the data in the static partition 346 are always the same every time when the main operating system 315 is booted up. On the other hand, the dynamic partition 348 stores the data of the user of the electronic device 300, such as documents created by the user or data downloaded by the user. The data in the dynamic partition 348 are changeable, which means the user can modify them. Therefore, the data in the dynamic partition 348 may be different every time when the main operating system 315 is booted up.

The non-volatile storage 340 includes a static backup table 342. The volatile storage 350 includes another static backup table 352. Each of the static backup tables 342 and 352 is configured for storing all of the required data for booting the main operating system 315 in the static partition 346. The volatile storage 350 includes a dynamic prefetch table 354. The dynamic prefetch table 354 is configured for storing all of the required data for booting the main operating system 315 in the dynamic partition 348.

In some other embodiments of the present invention, the electronic device 300 may include more than two processors. In this general case, one of the processors is a main processor and the other processors are auxiliary processors. Each of the main processor and the auxiliary processors executes an operating system. The main processor is coupled to the volatile storage, the non-volatile storage and each of the auxiliary processors of the electronic device 300.

The main operating system 315 requires some data for its booting sequence, such as applications, device drivers and software libraries. Some of the required data are stored in the static partition 346 and some of the required data are stored in the dynamic partition 348. These required data have to be copied from the non-volatile storage 340 to the volatile storage 350 for the main operating system 315 to access them. Since the speed of the main processor 310 is faster than that of the auxiliary processor 320, the main processor 310 has some time to prefetch the required data for booting the main operating system 315 from the partitions 346 and 348 into the tables 342, 352 and 354 while waiting for the auxiliary processor 320 to complete the booting state synchronization of the operating systems 315 and 325. The prefetching of the required data is performed by a method of file system prefetching shown in FIG. 4.

Figure 4:
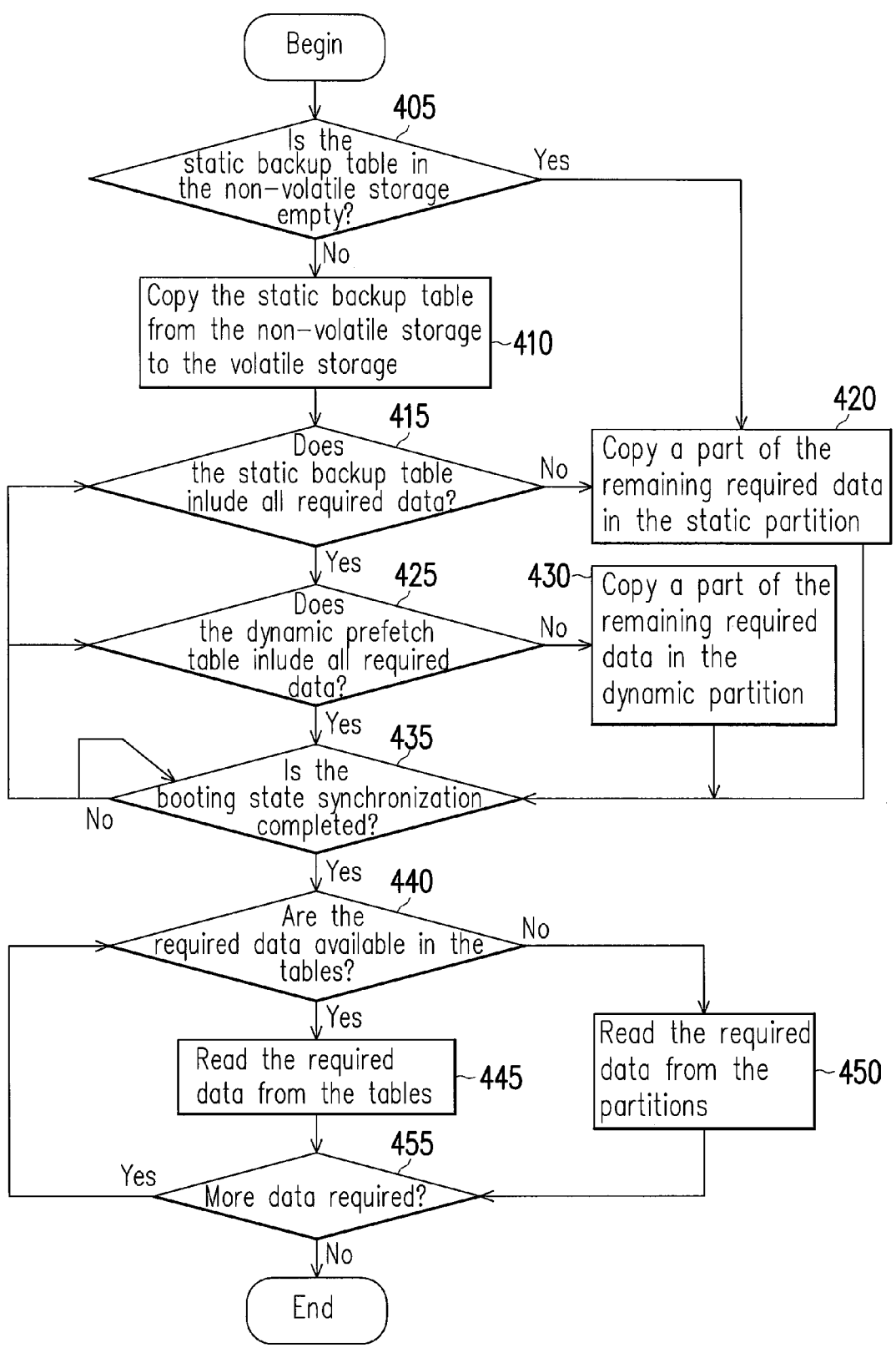
FIG. 4 is a flow chart showing a method of file system prefetching according to an embodiment of the present invention.

FIG. 4 is a flow chart showing a method of file system prefetching according to an embodiment of the present invention. The method of file system prefetching may be executed by a main processor of an electronic device including a non-volatile storage, a volatile storage, multiple processors and multiple operating systems, such as the main processor 310 of the electronic device 300. After the power of the electronic device 300 is turned on, the main processor 310 finishes its own initialization and then begins to boot up the main operating system 315. This is the moment when the main processor 310 executes the method of file system prefetching.

The flow of the method of file system prefetching is recited below. At step 405, check whether the static backup table 342 in the non-volatile storage 340 is empty or not. When the static backup table 342 is empty, the flow proceeds to step 420. When the static backup table 342 is not empty, the flow proceeds to step 410. At step 410, copy all of the data in the static backup table 342 to the static backup table 352 in the volatile storage 350. The data stored in the static backup table 352 will be used in the booting sequence of the main operating system 315.

Next, at step 415, check whether the static backup table 342 includes all of the required data for booting the main operating systems 315 in the static partition 346 or not. When the static backup table 342 already includes all of the required data in the static partition 346, the flow proceeds to step 425. When the static backup table 342 does not include all of the required data in the static partition 346, the flow proceeds to step 420 to copy a part of the remaining required data in the static partition 346 to both the static backup tables 342 and 352. The prefetching of the required data from the static partition 346 to each of the static backup tables 342 and 352 is performed synchronously. When a piece of the required data is copied from the static partition 346 to the static backup table 3422, the same piece of the required data is also copied to the static backup table 352 at the same time.

Next, at step 435, check whether the booting state synchronization of all of the operating systems in the electronic device 300 is completed or not. When the power of the electronic device 300 is turned on, all processors of the electronic device 300 have to perform a booting state synchronization for establishing the communication mechanism among all of the processors and synchronizing the booting states of all of the operating systems to ensure a correct booting of the electronic device 300. When the booting state synchronization is completed, the flow proceeds to step 440. When the booting state synchronization is not completed yet, the flow returns to step 415 to repeat the static prefetching loop formed by steps 415, 420 and 435.

The required data copied to the static backup table 352 will be used in the following booting sequence of the main operating system 315. The required data copied to the static backup table 342 can be copied to the static backup table 352 at step 410 next time when the method of file system prefetching is executed. The required data stored in the static partition 346 may be fragmented and widely distributed. At step 420, the main processor 310 stores the required data in the static partition 346 into the static backup tables 342 and 352 in a contiguous and defragmented way. Since the data in the static backup table 342 is defragmented, copying the required data from the static backup table 342 to the static backup table 352 is faster than copying the required data from the static partition 346 to the static backup table 352. This helps to shorten the booting time of the electronic device 300. Moreover, since the static backup table 342 is stored in the non-volatile storage 340, the data in the static backup table 342 do not volatilize after the power of the electronic device 300 is turned off. Next time when the power of the electronic device 300 is turned on, the data already stored in the static backup table 342 do not need to be copied again. This also helps to shorten the booting time of the electronic device 300.

When the static backup table 342 includes all of the required data for booting the main operating systems 315 in the static partition 346, the flow proceeds from step 415 to step 425. At step 425, check whether the dynamic prefetch table 354 in the volatile storage 350 includes all of the required data for booting the main operating system 315 in the dynamic partition 348 or not. When the dynamic prefetch table 354 already includes all of the required data in the dynamic partition 348, the flow proceeds to step 435. When the dynamic prefetch table 354 does not include all of the required data in the dynamic partition 348, the flow proceeds to step 430 to copy a part of the remaining required data in the dynamic partition 348 to the dynamic prefetch table 354.

Next, at step 435, check whether the processors complete the booting state synchronization or not. When the booting state synchronization is completed, the flow proceeds to step 440. When the booting state synchronization is not completed yet, the flow returns to step 425 to repeat the dynamic fetching loop formed by steps 425, 430 and 435. The required data copied to the dynamic prefetch table 354 will be used in the following booting sequence of the main operating system 315. Since the dynamic prefetch table 354 is stored in the volatile storage 350, the data in the dynamic prefetch table 354 are copied from scratch each time when the power of the electronic device 300 is turned on.

When the dynamic prefetch table 354 includes all of the required data for booting the main operating systems 315 in the dynamic partition 348, the flow proceeds from step 425 to step 435. At step 435, check whether the processors complete the booting state synchronization or not. When the booting state synchronization is not completed yet, step 435 is repeated until the booting state synchronization is completed.

Next, at step 440, check whether or not the required data for booting the main operating system 315 are available in the static backup table 352 or the dynamic prefetch table 354. When the required data are available in the static backup table 352 or the dynamic prefetch table 354, the flow proceeds to step 445 to read the required data for booting the main operating system 315 from the static backup table 352 or the dynamic prefetch table 354. Otherwise, the flow proceeds to step 450 to read the required data from the static partition 346 or the dynamic partition 348 for booting the main operating system 315. Next, at step 455, check whether the booting sequence of the main operating system 315 requires more data or not. When the booting sequence requires more data, the flow returns to step 440. When the booting sequence does not require more data, the flow of the method of file system prefetching ends here.

In the booting sequence of an electronic device with multiple processors and multiple operating systems, the bottleneck is copying the required data from the non-volatile storage to the volatile storage. The method and the electronic device provided by the present invention can prefetch the required data in the time waiting for the booting state synchronization to shorten the booting time of the electronic device. In some embodiments of the present invention, the method and the electronic device provided by the present invention can reduce 5%-60% of the time of copying the required data from the non-volatile storage to the volatile storage.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of file system prefetching, applicable to an electronic device comprising a volatile storage, a non-volatile storage, and a plurality of processors with a plurality of operating systems, the method comprising:

when a first static backup table in the non-volatile storage is not empty, copying all data in the first static backup table to a second static backup table in the volatile storage;

checking whether the first static backup table comprises all required data for booting one of the operating systems in a static partition of the non-volatile storage or not;

when the first static backup table does not comprise all of the required data in the static partition, copying a part of the remaining required data in the static partition to the first and the second static backup tables; and when a booting state synchronization of the operating systems is not completed yet, returning to the step of checking whether the first static backup table comprises all of the required data in the static partition or not.

2. The method of claim 1, wherein the required data in the static partition are stored in the first and the second static backup tables in a contiguous and defragmented way.

3. The method of claim 1, further comprising:

checking whether a dynamic prefetch table in the volatile storage comprises all required data for booting the one operating system in a dynamic partition of the non-volatile storage or not;

when the dynamic prefetch table does not comprise all of the required data in the dynamic partition, copying a part of the remaining required data in the dynamic partition to the dynamic prefetch table; and when the booting state synchronization is not completed yet, returning to the step of checking whether the dynamic prefetch table comprises all of the required data in the dynamic partition or not.

4. The method of claim 3, wherein the data in the static partition are unchangeable and the data in the dynamic partition are changeable.

5. The method of claim 1, wherein after the booting state synchronization is completed, the method further comprises:

when the required data for booting the one operating system are available in the second static backup table or the dynamic prefetch table, reading the required data from the second static backup table or the dynamic prefetch table, otherwise reading the required data from the static partition or the dynamic partition.

6. An electronic device of file system prefetching, comprising:

a volatile storage;

a non-volatile storage, and a plurality of processors with a plurality of operating systems, wherein one of the plurality of processors is a main processor and the other ones of the plurality of processors are auxiliary processors, the main processor is coupled to the volatile storage, the non-volatile storage and the auxiliary processors; when a first static backup table in the non-volatile storage is not empty, the main processor copies all data in the first static backup table to a second static backup table in the volatile storage; the main processor checks whether the first static backup table comprises all required data for booting one of the operating systems in a static partition of the non-volatile storage or not; when the first static backup table does not comprise all of the required data in the static partition, the main processor copies a part of the remaining required data in the static partition to the first and the second static backup tables; when a booting state synchronization of the operating systems is not completed yet, the main processor returns to the step of checking whether the first static backup table comprises all of the required data in the static partition or not.

7. The electronic device of claim 6, wherein the main processor stores the required data in the static partition in the first and the second static backup tables in a contiguous and defragmented way.

8. The electronic device of claim 6, wherein the main processor checks whether a dynamic prefetch table in the volatile storage comprises all required data for booting the one operating system in a dynamic partition of the non-volatile storage or not; when the dynamic prefetch table does not comprise all of the required data in the dynamic partition, the main processor copies a part of the remaining required data in the dynamic partition to the dynamic prefetch table; when the booting state synchronization is not completed yet, the main processor returns to the step of checking whether the dynamic prefetch table comprises all of the required data in the dynamic partition or not.

9. The electronic device of claim 8, wherein the data in the static partition are unchangeable and the data in the dynamic partition are changeable.

10. The electronic device of claim 6, wherein after the booting state synchronization is completed, the main processor reads the required data for booting the one operating system from the second static backup table or the dynamic prefetch table when the required data are available in the second static backup table or the dynamic prefetch table, otherwise the main processor reads the required data from the static partition or the dynamic partition.

* * * * *